(12) United States Patent
Geurts

(10) Patent No.: US 12,676,000 B2
(45) Date of Patent: Jul. 7, 2026

(54) METHOD AND SYSTEM FOR PERFORMING CHARACTERIZATION OF ONE OR MORE MATERIALS

(71) Applicant: VITO NV, Mol (BE)

(72) Inventor: Roeland Geurts, Mol (BE)

(73) Assignee: VITO NV, Mol (BE)

( * ) Notice: Subject to any disclaimer, the term of this patent is extended or adjusted under 35 U.S.C. 154(b) by 317 days.

(21) Appl. No.: 18/689,205

(22) PCT Filed: Oct. 6, 2022

(86) PCT No.: PCT/EP2022/077854
§ 371 (c)(1),
(2) Date: Mar. 5, 2024

(87) PCT Pub. No.: WO2023/057593
PCT Pub. Date: Apr. 13, 2023

(65) Prior Publication Data
US 2024/0273905 A1 Aug. 15, 2024

(30) Foreign Application Priority Data

Oct. 8, 2021 (EP) ..................................... 21201747

(51) Int. Cl.
*G06V 20/50* (2022.01)
*B07C 5/34* (2006.01)
(Continued)

(52) U.S. Cl.
CPC ............ *G06V 20/50* (2022.01); *B07C 5/3416* (2013.01); *G01N 23/04* (2013.01); *G01N 23/083* (2013.01);
(Continued)

(58) Field of Classification Search
CPC ...... G06V 20/50; G06V 10/26; G06V 10/764; G06V 2201/06; G06V 10/40; G06V 20/52;
(Continued)

(56) References Cited

U.S. PATENT DOCUMENTS

| | | | |
|---|---|---|---|
| 2016/0042571 A1 | 2/2016 | Mikheev et al. | |
| 2019/0259160 A1* | 8/2019 | Simanovsky | ........... G06V 20/52 |
| 2020/0379427 A1 | 12/2020 | Tao et al. | |

FOREIGN PATENT DOCUMENTS

| | | |
|---|---|---|
| EP | 3839886 A1 | 6/2021 |
| WO | 2016011205 A1 | 1/2016 |

OTHER PUBLICATIONS

International Search Report and Written Opinion—PCT/EP2022/077854—mailing date Apr. 13, 2023.

* cited by examiner

*Primary Examiner* — Stephen R Koziol
*Assistant Examiner* — Michael Kim Maiden
(74) *Attorney, Agent, or Firm* — Banner & Witcoff, Ltd.

(57) ABSTRACT

A method and system for performing characterization of one or more materials. The one or more materials are scanned by means of a sensory unit including an x-ray sensor for obtaining at least one x-ray image. Segmentation of the at least one x-ray image is performed in order to separate one or more distinct objects in the at least one x-ray image. In the at least one x-ray image, segmented objects are selected. For each of the selected segmented objects in the at least one x-ray image, a transformation using a transformation model is computed, wherein each transformation is indicative of a three dimensional reconstruction of the respective selected segmented object in the at least one x-ray image. The selected segmented objects are characterized based upon its computed transformation.

20 Claims, 6 Drawing Sheets

(51) Int. Cl.

| | |
|---|---|
| *G01N 23/04* | (2018.01) |
| *G01N 23/083* | (2018.01) |
| *G06V 10/26* | (2022.01) |
| *G06V 10/764* | (2022.01) |

(52) U.S. Cl.
CPC ............ G06V 10/26 (2022.01); G06V 10/764
(2022.01); *B07C 2501/0054* (2013.01); *G01N*
*2223/401* (2013.01); *G01N 2223/643*
(2013.01)

(58) Field of Classification Search
CPC .......... B07C 5/3416; B07C 2501/0054; G01N
23/083; G01N 10/26; G01N 2223/401;
G01N 2223/643; G06N 3/0455; G06N
3/084; G06N 3/09; G06T 2207/10116;
G06T 7/50
See application file for complete search history.

METHOD AND SYSTEM FOR PERFORMING CHARACTERIZATION OF ONE OR MORE MATERIALS

CROSS-REFERENCE TO RELATED APPLICATIONS

This application is a U.S. National Stage application under 35 U.S.C. § 371 of International Application PCT/EP2022/077854 (published as WO 2023/057593 A1), filed Oct. 6, 2022, which claims the benefit of priority to Application EP 21201747.9, filed Oct. 8, 2021. Benefit of the filing date of these prior applications is hereby claimed. Each of these prior applications is hereby incorporated by reference in its entirety.

FIELD OF THE INVENTION

The invention relates to a method of performing characterization of one or more materials. The invention also relates to a system for performing characterization of one or more materials. Additionally, the invention relates to a method of recycling and a recycling device. Also, the invention relates to a method of training a machine learning model. Furthermore, the invention relates to a computer program product.

BACKGROUND TO THE INVENTION

An accurate characterization of materials using x-ray plays an important role for various applications. Often, rather complex and costly systems are used for providing accurate characterization of objects being scanned.

In some cases, machine learning is employed for characterizing the objects being scanned by a x-ray sensor. Effective data classification plays an increasingly important role. For instance, a computer vision application may apply a classifier or a statistical model (e.g. machine learning model, regression model) to captured images or video streams in order to recognize components or objects therein. To ensure reliable performance of the classifier, it must be trained using a plurality of labeled examples. Such systems often rely on human labor to manually label the data.

The characterization of one or more components in material streams has several important applications, for example in recycling processes, agricultural processes, food productions processes, etc. The characterization can for instance be used for quality control, value assessment, and process engineering and control. For example, for waste processing, conventionally many waste streams are suboptimally recycled due to the lack of characterization data. There is a need for an adequate characterization technology for heterogeneous material streams (e.g. bulk solid waste streams).

A machine learning model is a statistical classifier which can be trained using large amounts of data which can be labeled by humans and/or experimentation. Such labeling can be a labor-intensive and/or expensive process. One of the bottlenecks in building an accurate statistical system is the time spent (manual) labeling in order to have high quality labeled data. Typically, samples to be labeled (cf. new data points) are chosen randomly so that the training data matches the test set.

When three-dimensional (3D) objects are scanned by performing x-ray imaging, for instance with a typical x-ray transmission setup, the objects are projected into a two-dimensional plane. This may challenge material discrimination since the resulting x-ray image includes a combined effect of the different materials the x-ray radiation (cf. photons) encounter when travelling through the 3D object. The known systems used for overcoming this limitation are configured to take a plurality of different images from different angles, and subsequently calculating a 3D reconstruction of the objects. This is well known as computed tomography (CT), a technique used for instance in medical imaging. However, such traditional techniques are not usable for various applications, for instance in industrial settings where a high throughput is important. There is a need to more efficiently perform characterization of one or more materials using x-ray imaging.

Moreover, determining a ground truth during training of machine learning models can be rather labor intensive and time-consuming in various cases and applications. There is a strong desire for effectively obtain a well trained prediction model while reducing the effort and/or cost required therefor. There is a need to more efficiently obtain such prediction model.

SUMMARY OF THE INVENTION

It is an object of the invention to provide for a method and a system that obviates at least one of the above mentioned drawbacks.

Additionally or alternatively, it is an object of the invention to improve the characterization of one or more materials by means of an x-ray sensor. Additionally or alternatively, it is an object of the invention to more efficiently characterize objects in x-ray images.

Additionally or alternatively, it is an object of the invention to improve the training of machine learning models configured to characterize or identify objects in x-ray images.

Thereto, the invention provides for a method of performing characterization of one or more materials, the method comprising: scanning the one or more materials by means of a sensory unit including an x-ray sensor for obtaining at least one x-ray image; performing segmentation of the at least one x-ray image in order to separate one or more distinct objects in the at least one x-ray image; selecting, in the at least one x-ray image, segmented objects; computing, for each of the selected segmented objects in the at least one x-ray image, a transformation using a transformation model, wherein each transformation is indicative of a three dimensional (3D) reconstruction of the respective selected segmented object in the at least one x-ray image; and characterizing the selected segmented objects based upon its computed transformation.

Advantageously, by computing a transformation which is indicative of a three-dimensional reconstruction of the respective selected segmented objects in the x-ray image, the influence of less relevant material (e.g. background material) can be reduced or even completely filtered out. In this way, it is possible to focus on only relevant regions or materials of interest, e.g. on selected layers of interest in a battery cell or cylindrical battery. This may allow for example a machine learning algorithm to train significantly faster. The training of the machine learning model may require significantly less data, making the training process more efficient. It may be easier to determine the ground truth for discriminating different types of batteries during the training process. For example, only selected relevant layers of the 3D reconstructed x-ray image may be taken into account for determining the ground truth. In addition, the reconstructed x-ray image may contribute to the explainability of the model.

Although a x-ray image may include a combined effect of different materials photons encountered when travelling through the 3D object, the invention still can reconstruct an image merely based on a single 2D x-ray image. In this way, the material discrimination may be improved. There is no need to employ complex x-ray systems configured to perform known computed tomography (CT) imaging or the like. Such systems may not be appropriate for use when a high throughput is desired, for instance with a material stream on a conveyor belt. It may be difficult to accurately x-ray image the moving objects/materials being conveyed on the conveyor belt. Various industrial settings may require such high throughput. The invention may improve material discrimination whilst using 2D images gathered from just one angle above the conveyor belt.

Optionally, geometrical properties of the segmented objects are estimated and provided as input to the transformation function/model (e.g. machine learning model). The transformation function/model may be configured to exploit geometrical properties of the object in order to be able to transform the 2D x-ray image of the object into a 3D x-ray image of the object.

If the 3D geometric information is estimated using 2D data in the x-ray image, for instance using a trained machine learning model, then said machine learning model can be seen as the transformation function/model. The output of said trained machine learning model may provide information indicative of a 3D x-ray image of the selected segmented object. The data in the 2D x-ray image can be mapped to the 3D reconstruction of the object.

Optionally, the segmented objects in the at least one x-ray image which are associated to symmetric objects are selected.

Advantageously, a three-dimensional reconstruction of the selected segmented objects can be effectively determined using the transformation. The transformation function may reconstruct a 3D object based on the 2D segmented object, taking into account one or more geometrical properties of the object. For instance, the transformation function may exploit the axially-symmetrical properties (e.g. cylindrical shape) of the object in order to build a 3D reconstruction. Different types of transformation functions may be employed. As a result of the 3D reconstruction, the ground truth determination of the selected segmented objects can be significantly improved. Additionally or alternatively, the ground truth determination of the selected segmented objects can be simplified and/or made more efficient. Such determination of the ground truth may subsequently be used for training a machine learning model. Hence, the process of training a machine learning model configured to characterize the one or more materials can be effectively enhanced.

Optionally, the segmented objects are associated to axially symmetric objects, and wherein the transformation is an inverse Abel transformation.

The invention can effectively exploit the axial symmetry of the object (e.g. cylindrical shape) in order to reconstruct a 3D x-ray image representation/reconstruction of the object. The Abel transform is an integral transform suitable for use with spherically symmetric or axially symmetric functions. From a projection (i.e. segmented object in the x-ray image) a 3D reconstruction of the object can be built (3D x-ray image of the segmented object). This provides significant advantages for characterization of cylindrical battery cells. Such cylindrical symmetry for the battery cells provides the additional information needed in order to perform the 3D reconstruction.

Optionally, the selected segmented objects are layered objects comprising at least two layers at least partially made of different materials.

Optionally, selection of segmented objects associated to symmetric objects involves estimating whether at least one symmetry line goes through identified segmented objects, wherein the at least one symmetry line is parallel to an imaging plane of the at least one x-ray image, and selecting only the segmented objects with symmetry lines.

Optionally, the method includes determining whether the symmetry line going through the segmented objects is substantially parallel to the imaging plane of the x-ray image. This may be important for building an accurate 3D reconstruction based on the 2D x-ray image (single x-ray image taken by means of an x-ray sensor positioned at a preset angle with respect to the surface on which the one or more materials are positioned). The axis of symmetry can be calculated in different ways. In some examples, axis of symmetry is calculated/estimated procedurally. However, it is also envisaged that the axis of symmetry is predicted/estimated using a statistical model, such as for instance a machine learning model.

Optionally, segmented objects associated to predefined shapes (e.g. cylindrical) are selected, a symmetry axis is drawn through the selected segmented objects (cylindrical shape), and a transformation is performed to reconstruct a 3D x-ray image of the segmented objects. For example, the cylindrical objects may be batteries. Advantageously, this provides the ability to view into individual layers of the cylindrical batteries. In this way, the training of machine learning models can be performed more efficiently, since the ground truth can more easily determined. Additionally, in some cases, this may provide improved accuracy if such information or data derived from that information is provided as input to a trained machine learning model.

Optionally, the symmetry line is a longitudinal axial symmetry axis.

Optionally, the method includes calculating whether the symmetry line is substantially perpendicular to the line of sight. In some examples, only those objects with such symmetry line may be selected. The method may provide accurate results when the symmetry line is parallel to the image plane.

In some examples, means are provided for positioning the cylindrical batteries in the one or more materials non-standing on a surface (cf. horizontally with its axial symmetry line substantially parallel to the surface). In some examples, this may be achieved by shaking the one or more materials.

Optionally, characterization of the selected segmented objects based upon its computed transformation is performed by means of a classification model, wherein the classification model is configured to classify between different types of symmetric objects.

The classification model may be a statistical model. For example, the statistical model may be a trained machine learning model, such as a deep learning network. Various machine learning models can be used.

Optionally, the classification model is configured to classify axially symmetric batteries, wherein the axially symmetric batteries have a plurality of winded layers made of a different materials.

The invention can be used for 3D reconstruction of cell batteries in x-ray image. Internally, cell batteries may be composed of winded foils/layers of different materials. The cell batteries may thus be cylindrically symmetric.

For battery classification, it may be advantageous to disentangle the x-ray information from the different layers, since a first subset of the plurality of layers are less relevant material (e.g. the steel casing, the nickel foil) and a second subset of the plurality of layers (e.g. the other layers) are more relevant material (e.g. cadmium, rare earth) for the characterization of the battery cell. The second subset of the plurality of layers may have the materials of interest needed for an accurate ground truth determination or material discrimination.

Optionally, the axially symmetric batteries are at least one of: cylindrical batteries or cell batteries.

For example, a cylindrical battery cell may have multiple layers which are rolled up on top of each other. For example, the battery cell may have four layers of different materials which are rolled up on top of each other to form the cylindrical shape of the battery cell. By building a 3D x-ray reconstructed of the battery cell, it is possible to unwrap the layers of the battery. One of the layers may be particularly of importance for accurate characterization of the battery cell (e.g. determination of ground truth for training a machine learning model). The method according to the invention enables to look into the layers more in detail. As a result, it is possible to improve the quality of an x-ray image of the battery cell, for easy interpretation and optional model training.

Optionally, for each selected segmented object, x-ray information associated to the plurality of winded layers are disentangled based upon the respective computed transformation, wherein only a portion of the x-ray information is provided as input to the classification mode, wherein the portion of the x-ray information is selected based on one or more predetermined materials of interest.

For example, by performing a 3D reconstruction of a cylindrical battery (battery cell), it is possible to more accurately view into the layers of the cylindrical battery. This allows for improved analysis or characterization of the cylindrical batteries based on the x-ray image. The reconstruction of the battery may allow unpeeling of the layers of the batteries, enabling to more particularly view important spots in the battery for being able to improve discrimination between types of batteries. In the 2D x-ray image, the projection is based on the x-ray radiation going through all the layers of the cylindrical battery (all layers over each other). As a result, the 2D x-ray image of the cylindrical battery also includes x-ray absorption information of irrelevant layers (all layers overlap in the image). By means of the reconstruction function, a 3D reconstruction can be obtained, and it is possible to 'roll out' the cylindrical battery layers, and see layer by layer how it interacts with the x-ray radiation. This in turn enables easy exclusion of information in the x-ray image related to irrelevant battery layers for the characterization. As a result, the characterization and analysis of the cylindrical battery can be significantly enhanced, allowing more accurate and easy determination of the ground truth associated to the cylindrical batteries, thereby improving the efficiency of training machine learning models. The performance of training machine learning models which are employed for the characterization of the cylindrical batteries can also be improved in this way. It will be appreciated that the invention can also be used for other materials instead of cylindrical batteries, such as for instance hardware, fuel cells, semiconductor components, etc.

Optionally, the one or more predetermined materials of interest include cadmium and/or one or more rare earth metals.

For example, a better distinction can be made between nickel cadmium and nickel metal hydride batteries by considering cadmium and/or rare earth metal(s) as materials of interest.

Optionally, the one or more materials are moved on a conveyor, thereby forming a material stream which is scanned by means of the sensory unit, wherein the sensory unit is configured to produce two dimensional (2D) x-ray images gathered from one angle above the conveyor belt.

Optionally, the material stream is a non-homogeneous material stream comprising batteries, wherein the material stream includes at least cylindrical batteries, preferably multiple types of cylindrical batteries.

In the 2D x-ray image, the different layers of the cylindrical battery are averaged out. The reconstruction of a cylindrical battery allows rolling out the layers and separately view the layers of the cylindrical battery. In this way, it is possible to extract x-ray information directly associated to each layer. This can provide significant advantages in characterization and analysis of the x-ray imaging. Furthermore, it can also be used in post-analysis of the x-ray images, for example in cases where there is an uncertainty about the classification, the ground truth can more easily be determined. In this way, the training process of the machine learning model can be improved. A lot of data is decoupled from each other. The correlated data in the 2D x-ray image is taken apart in the 3D x-ray reconstruction image, typically requiring less training data.

Optionally, the inverse Abel transformation employs at least one of an onion peeling technique or a basis-set expansion technique.

Other inverse Abel transformation techniques known in the art may also be employed, for example the three-point method, two-point method, the direct method, the hansenlaw method, the lin-BASEX method, the Bordas onion peeling method, the rBasex method, or the like. A combination of inverse Abel transformation techniques may also be utilized.

Optionally, selection of segmented objects are performed utilizing a trained machine learning model.

Optionally, the transformation function performs a 3D reconstruction based on a geometric model. The geometric model may be estimated, for instance using a machine learning model and/or using a predefined database with 3D shapes, or may be predetermined.

The selected segmented object in the x-ray image can be provided as input to the transformation function, and the transformation function can generate an output indicative of the three dimensional reconstruction of the respective selected segmented object.

Optionally, information related to three dimensional geometrical properties of the selected segmented object are provided to the transformation function.

Optionally, the information related to three dimensional geometrical properties of the selected segment object is estimated by means of a trained machine learning model.

Optionally, the information related to three dimensional geometrical properties of the selected segment object is estimated experimentally.

Optionally, the sensory system further includes a depth imaging unit for determining data indicative of a volume of segmented objects.

Optionally, data measured by the depth imaging unit is used for estimating information related to three dimensional geometrical properties of the selected segment object.

Optionally, the depth imaging unit includes at least one of a three-dimensional laser triangulation unit or three-dimensional camera.

Optionally, the sensory system further includes a colour imaging unit configured to take colour images of the segmented objects.

Optionally, data from different subsystems of the sensory system is aligned prior to determining characteristic features for each of the one or more segmented objects.

Optionally, for each of the one or more segmented objects further characteristic features relating to at least one of a volume, dimension, diameter, shape, texture, colour, or eccentricity, are determined.

Optionally, the one or more materials are non-homogeneous.

Optionally, the one or more materials are selected from a group consisting of solid waste, produced products or components, agricultural products, or batteries.

According to an aspect, the invention provides for a system for performing characterization of one or more materials, the system comprising: a sensory unit configured to scan the one or more materials, the sensory unit including an x-ray sensor for obtaining at least one x-ray image; and a controller; and wherein the controller is configured to: perform segmentation of the at least one x-ray image in order to separate one or more distinct objects in the at least one x-ray image; select, in the at least one x-ray image, segmented objects; compute, for each of the selected segmented objects in the at least one x-ray image, a transformation using a transformation model, wherein each transformation is indicative of a three dimensional reconstruction of the respective selected segmented object in the at least one x-ray image; and characterize the selected segmented objects based upon its computed transformation.

In computed tomography (CT), a reconstruction is made based 360 degrees imaging around the object. Such a set-up is often unpractical and overcomplicated for use for performing characterization on a stream of materials, for instance conveyed on a conveyor belt. The current invention enables to more efficiently characterize the objects in the x-ray image (e.g. cylindrical batteries, fuel cells, catalysts, etc.) with using multiple x-ray imaging techniques such as for instance employed in CT systems. The invention can build a reconstruction which is indicative of a three-dimensional reconstruction of the respective selected segmented objects in the at least one x-ray image, based on a single x-ray image (i.e. 2D x-ray image taken in 1 plane). Since the transformation function can assume some information with regard to the geometrical shape of the selected segmented objects, for instance related to axial-symmetry, spherical symmetry, cylindrical shape (cf. battery), predicting/estimation of 3D shape, etc., it can effectively build the 3D reconstruction.

Advantageously, the use of relatively complex systems such as CT systems are therefore no longer necessary, resulting in faster results whilst providing a high accuracy which is beneficial for training the machine learning models. The reconstruction can be performed based on a single x-ray image (i.e. in one plane), not requiring a rotating mechanism such as for instance employed in CT imaging systems or the like. It becomes easier to determine the ground truth, which can be used for training the machine learning models which are configured to characterize the one or more materials.

In some examples, the system is an inspection system configured to inspect batteries (e.g. waste stream, stream of batteries on a conveyor belt). In such cases, it may be difficult to arrange an inline CT imaging system. Often, a continuous characterization of a stream of materials, for instance the stream of materials being carried on a conveyor belt or the x-ray sensor being scanned of the one or more materials, is desired. Building a CT imaging system for such cases may be very costly and impractical. The system would be large, unpractical and have inherent limitations. In contrast, the system of the invention can be easily arranged in such arrangements for continuous characterization of one or more materials. Advantageously, the system can be applied for inline characterization of materials in a material stream, for example carried on a conveyor belt.

According to an aspect, the invention provides for a computer program product configured for performing, when run on a controller, the steps of the method according to the invention.

Advantageously, an accurate characterization may be performed, wherein a subset of objects in the 2D x-ray images are transformed such as to obtain a 3D reconstruction of the subset of objects. It may not be required to provide 3D scanning devices or the like, for reconstructing the 3D x-ray image of the object. Therefore, the characterization can be significantly improved merely using one or more 2D x-ray images.

Optionally, the transformation function is a reverse transformation function which is configured to reconstruct a 3D object based on its projection in a 2D plane. The transformation function may exploit knowledge about the object in the 2D x-ray image, for instance its axial symmetry, spherical shape, rectangular shape, etc. In some cases, the 3D shapes of the objects are known, and are associated to the segmented objects in the x-ray image. Optionally, a trained machine learning model is employed which is configured to estimate/predict a 3D geometrical shape of an object based on its 2D projection in the 2D x-ray image.

According to an aspect, the invention provides for a recycling device configured to sort a waste stream, wherein the recycling device includes the system according to the invention for distinguishing different materials in the waste stream.

According to an aspect, the invention provides for a method of recycling, wherein the one or more materials in a waste stream are characterized by means of the method according to the invention.

According to an aspect, the invention provides for a method of training a machine learning model, wherein ground truth labels of one or more materials are determined by using the characterization method according to the invention.

It will be appreciated that the transformation function may also include a trained machine learning model which is configured to predict/estimate a 3D shape of an object based on its 2D projection in the x-ray image. It is also possible that the a predefined set of 3D shapes are stored in a database and, the 2D projections of the objects in the x-ray image are linked to one of the predefined set of 3D shapes. The transformation function can then perform the 3D reconstruction of the object based on the associated 3D shape.

It will be appreciated that axially symmetric objects may also include spherically symmetric objects.

It will be appreciated that any of the aspects, features and options described in view of the methods apply equally to the systems and the described devices. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 5 shows exemplary reconstructed x-ray image of nickel metal hydride battery cells.

DETAILED DESCRIPTION

Figure 1:
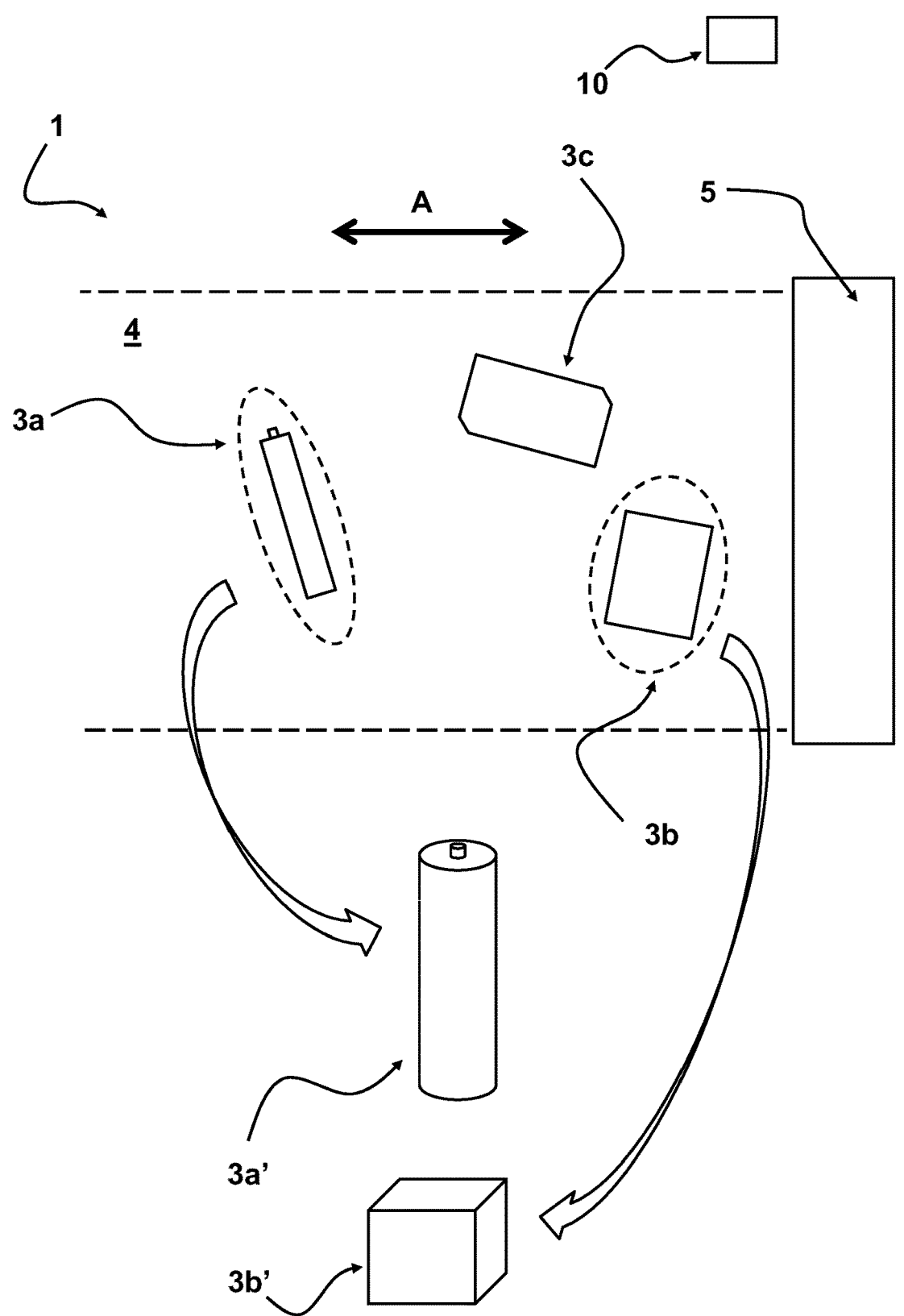
FIG. 1 shows a schematic diagram of a system.

FIG. 1 shows a schematic diagram of a system 1 for performing characterization of one or more materials 3*a*, 3*b*, 3*c*. The system 1 comprises a sensory unit 5 configured to scan the one or more materials 3. The sensory unit 5 includes an x-ray sensor for obtaining at least one x-ray image. The system further comprises a controller 10 configured to perform segmentation of the at least one x-ray image in order to separate one or more distinct objects in the at least one x-ray image. Furthermore, the controller 10 is configured to select in the at least one x-ray image, segmented objects according to one or more selection rules (e.g. objects having certain properties based on which a 3D reconstruction can be made). Furthermore, the controller 10 is configured to compute, for each of the selected segmented objects in the at least one x-ray image, a transformation using a transformation model, wherein each transformation is indicative of a three dimensional reconstruction of the respective selected segmented object in the at least one x-ray image. The selected segmented objects are subsequently characterized at least partially based upon its computed transformation.

In the shown embodiment, two objects 3*a*, 3*b* are selected. The first object 3*a* corresponds to a cylindrical battery. In the 2D x-ray image obtained by means of the sensory unit 5, a projection of the cylindrical battery in two dimensions is obtained. A three dimensional reconstruction 3*a*' for the axially symmetrical object is built by performing for instance an inverse Abel transformation. Furthermore, the second object 3*b* corresponds to a rectangular cuboid or block shaped object. A transformation model is employed which transforms the projection of the cube in the 2D x-ray image into a 3D reconstructed x-ray image of said cube. For some objects, the transformation model may not be capable to accurately calculate a 3D representation or reconstruction. This may for instance be the case of the third object 3*c*, for which the segmented object in the x-ray image is not selected.

The one or more materials are placed on a surface 4. The surface 4 may for instance be a surface of a conveyor belt which is moved in the direction A. However, additionally or alternatively, it is also possible that the sensory unit 5 is moved with respect to the surface 4 for obtaining relative movement in the direction A. All kinematic inversions are envisaged.

The transformation may utilize a mathematical transformation function/model which is configured to build a three-dimensional reconstruction of the selected segmented objects. The transformation may have some assumptions, for instance that the object has certain geometrical properties. For instance, in case of axially symmetrical objects, the three-dimensional reconstruction may be obtained by means of an integral transformation function, such as the inverse Abel transformation.

Figure 2:
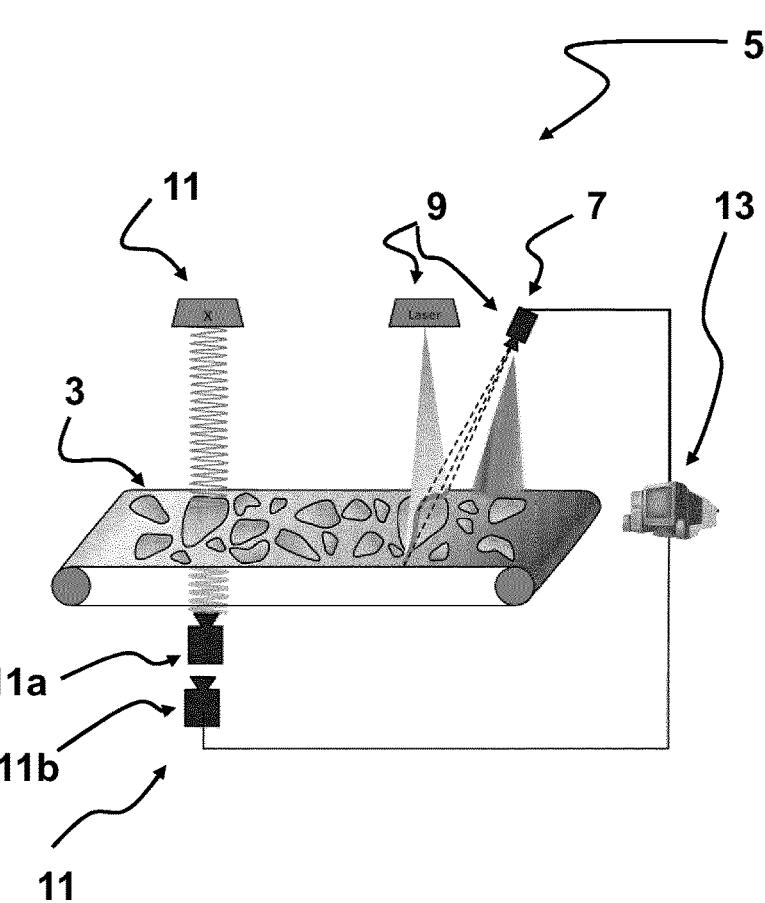
FIG. 2 shows a schematic diagram of a system.

FIG. 2 shows a schematic diagram of an embodiment of a system 1. In this example, at least one of an optional (color) camera 7 or optional 3D laser triangulation unit 9 are arranged in order to enable determining additional characteristics linked to each of the segmented objects. Hence, in some examples, next to features/characteristics relating to material type, mass, etc., it is also possible to make a distinction between the identified and/or segmented objects based on at least one of size, shape, color, texture, visual insights, etc. Such information may also enable virtual experimenting. In this example, the sensory unit 5 includes an X-ray sensor 11 having two X-ray sub-units 11*a*, 11*b* for performing dual-energy X-ray imaging. However, other types of x-ray imaging sensors may be provided. Furthermore, the camera 7 and 3D laser triangulation unit 9 are integrated in the sensory unit 5. In this way, the sensory unit 5 provides a plurality of images which can be aligned and/or fused, for instance by a computer unit 13. Aligning and/or fusing of the imaging data obtained from different camera's/detectors can enable a better determination of the features/characteristics of the segmented objects. The one or more materials are segmented and the individual segmented objects 3*i* are analyzed for determining relevant features/characteristics thereof. In this example, the following features 15 are determined for each segmented object: density, material, shape, size and mass. It will be appreciated that other sets of features are also possible.

The camera 7 may also be a 3D camera. In such case, the 3D laser triangulation unit 9 may not be needed. The data obtained by means of at least one of the camera 7 or the laser triangulation unit 9 can be used for determining information with regard to geometrical properties of the objects. This information can be used by the transformation model for accurately building information indicative of a three dimensional reconstruction of the respective selected segmented object in the at least one x-ray image, such as to obtain a 3D x-ray image of the selected segmented objects.

However, it is also possible that the transformation model uses particular assumptions in order to calculate a 3D reconstruction of the respective selected segmented objects. In such case, the arrangement of the camera 7 and/or the triangulation unit 9 may not be required. For instance, the transformation model may exploit the axial symmetry of the object in order to reconstruct a 3D x-ray image of the segmented object, for instance using the Abel transformation. It is also envisaged that a machine learning model is employed for estimating/predicting the 3D x-ray image of the selected segmented object based on the 2D x-ray image of the selected segmented object.

Figure 3A:
FIG. 3*a*, 3*b* show a x-ray image and a reconstructed x-ray image of an object, respectively.
Figure 3A:
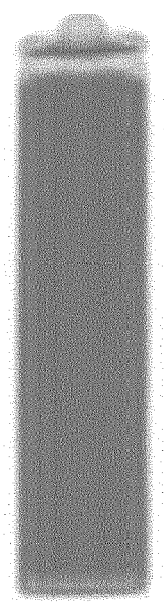
Figure 3B:
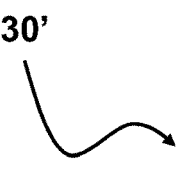
Figure 3B:
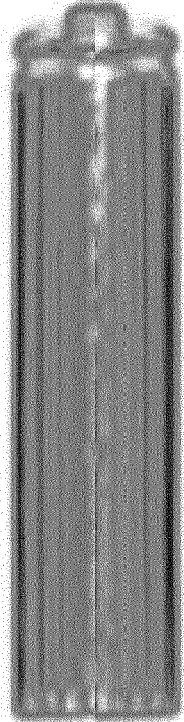

FIG. 3*a*, 3*b* show a x-ray image 30 and a reconstructed x-ray image 30' of an object, respectively. A cross sectional view of the 3D reconstructed x-ray image 30' is shown in FIG. 3*b*. It can be seen that in the reconstructed x-ray image 30' of the exemplary cylindrical battery substantially more details are visible, allowing to make a better distinction between the types of batteries (e.g. between nickel cadmium and nickel metal hydride). Although this example shows an axially symmetric cylindrical battery cell, it will be appreciated that the method can also be applied on other types of materials or objects, for example non-symmetrical objects.

The 3D reconstruction may be a 3D geometric model including the x-ray information from the 2D x-ray image. For example, cylindrical batteries in the 2D x-ray image may be reconstructed, enabling to specifically looking into certain layers of the battery in the X-rays. In this way, determining the ground truth may be facilitated, enabling a more efficient and more effective training of machine learning models configured to identify and/or characterize objects in x-ray image.

Figure 4:
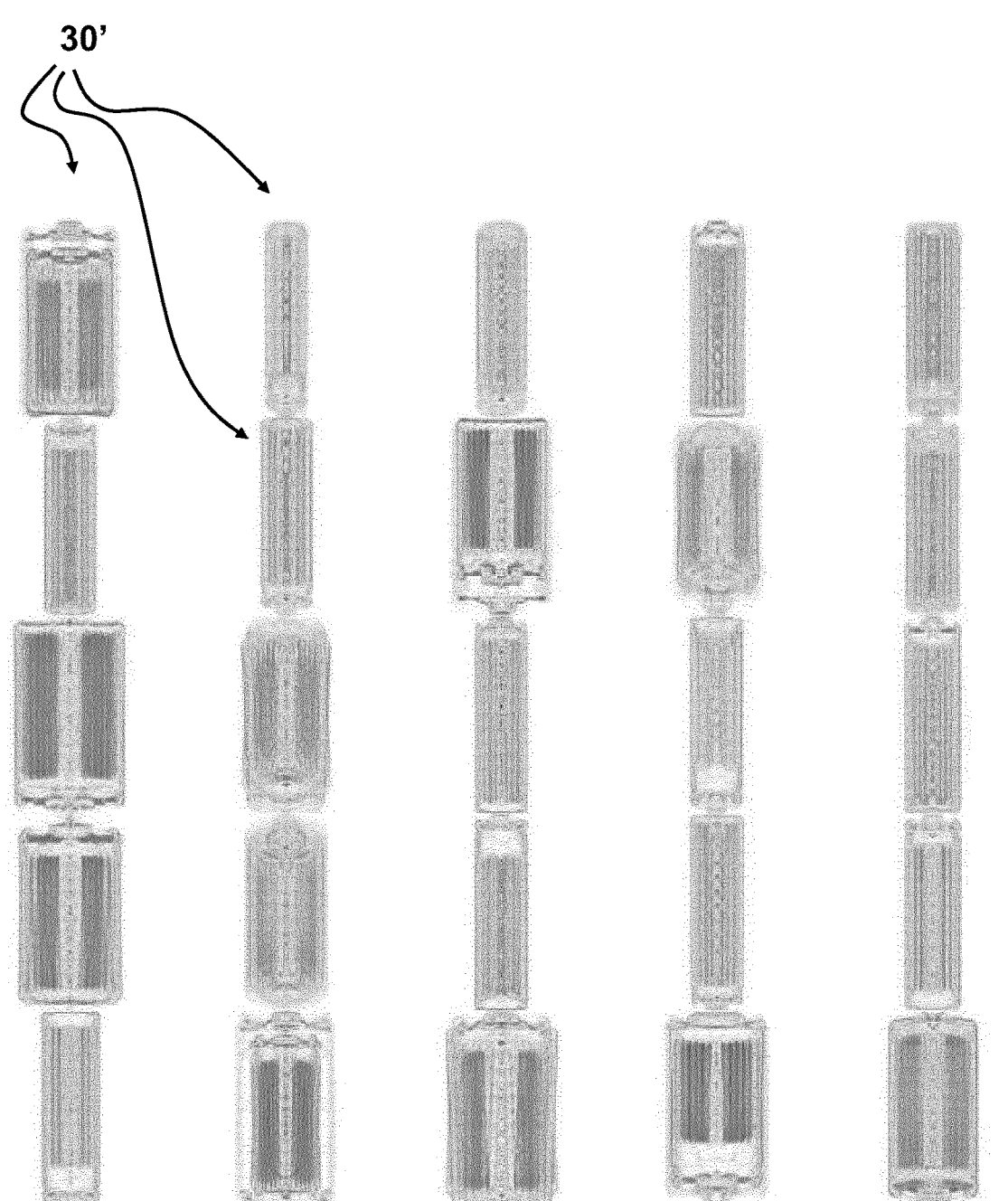
FIG. 4 shows exemplary reconstructed x-ray images of nickel cadmium battery cells.
Figure 5:
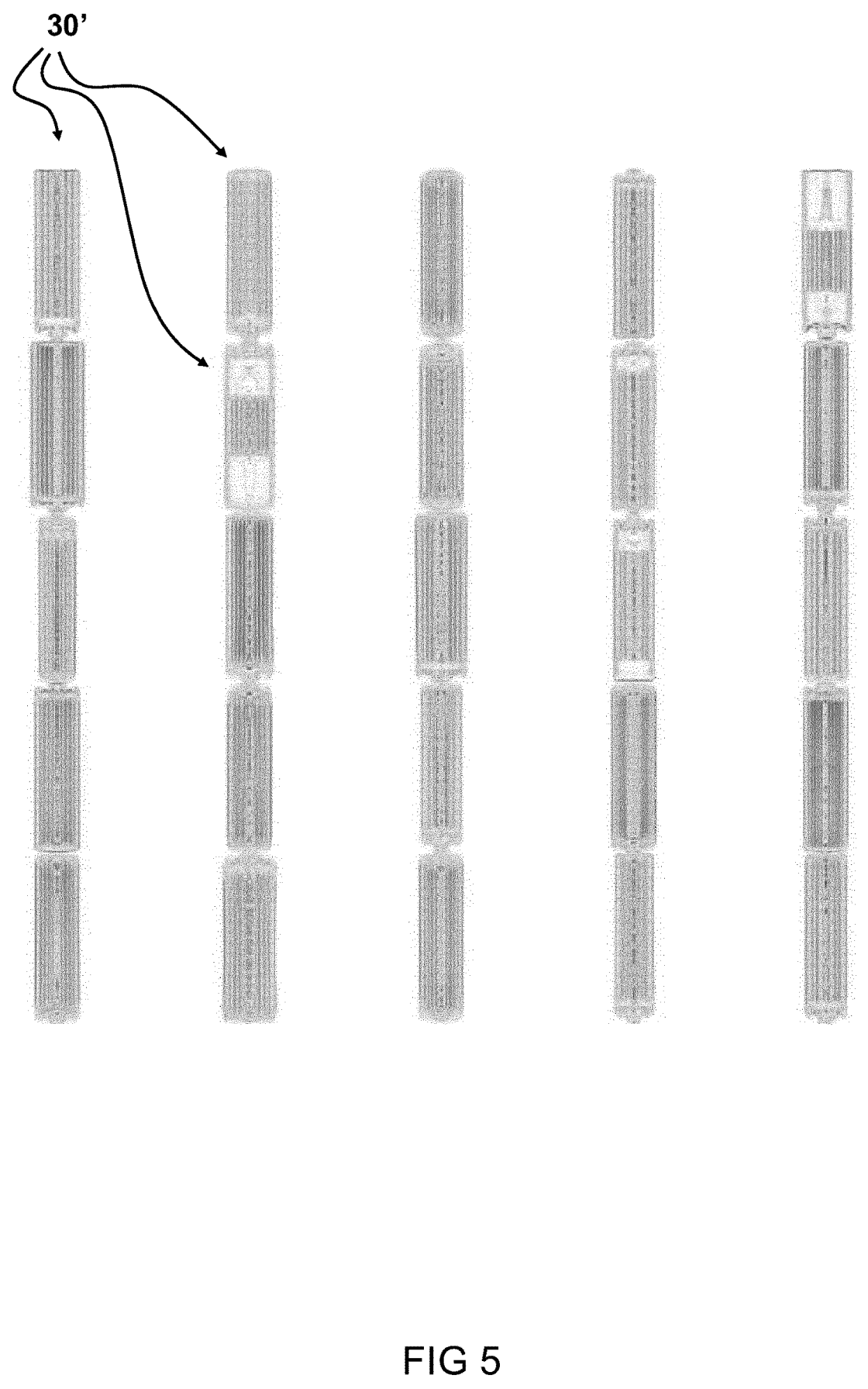

FIGS. 4 and 5 show exemplary reconstructed x-ray images 30' of nickel cadmium battery cells and nickel metal hydride battery cells, respectively. The reconstructed x-ray images provide significantly more detail.

The 3D reconstruction of the selected segmented objects in the x-ray image allows for viewing cross-sections for looking inside the 3D reconstructed object, resulting in an improved object characterization and/or ground truth determination. The 3D reconstruction allows to accurately unroll different layers of the material (e.g. cylindrical battery with different layers), and therefore disentangle the x-ray signals of otherwise overlapping materials, allowing accurate material characterization on layer-by-layer basis (cf. onion peeling).

For example, when dealing with an axially symmetric object, such as a cylindrical battery, the information about the layers in the obtained 2D image is present in a very specific way. The axial symmetry can be exploited by the transformation function in order to build an accurate 3D x-ray image reconstruction of the object in the 2D x-ray image.

Advantageously, the method and system enable a better distinction between nickel cadmium cylindrical and nickel metal hydride cylindrical batteries based on 2D x-ray images. The difference between said two types of batteries becomes clearly visible using the 3D reconstructed x-ray image, e.g. unfolding the layers of the cylindrical batteries. Advantageously, the training of the machine learning models can become significantly more efficient.

Figure 6:
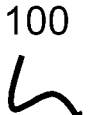
FIG. 6 shows a schematic diagram of a method.
Figure 6:
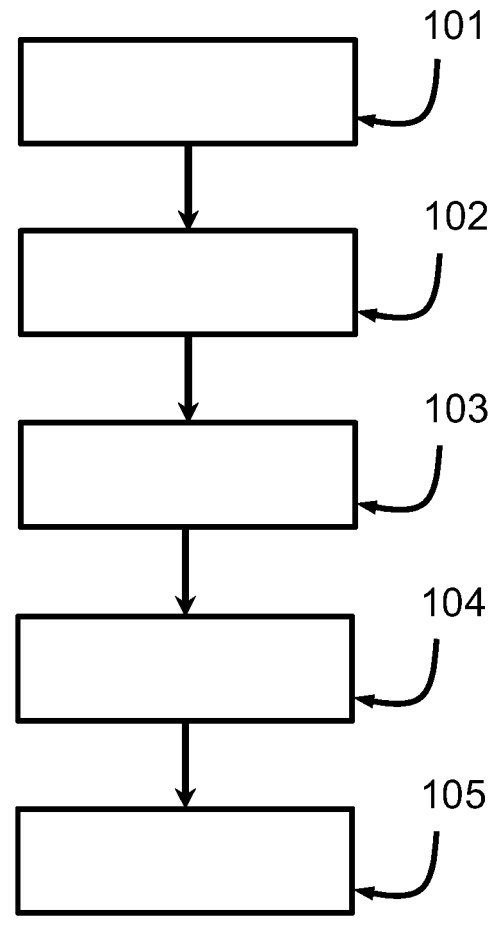

FIG. 6 shows a schematic diagram of a method 100 of performing characterization of one or more materials. In a first step 101, the one or more materials are scanned by means of a sensory unit including an x-ray sensor for obtaining at least one x-ray image. In a second step 102, segmentation of the at least one x-ray image is performed in order to separate one or more distinct objects in the at least one x-ray image. In a third step 103, segmented objects are selected in the at least one x-ray image. In a fourth step 104, for each of the selected segmented objects in the at least one x-ray image, a transformation is computed using a transformation model, wherein each transformation is indicative of a three dimensional reconstruction of the respective selected segmented object in the at least one x-ray image. In a fifth step 105, the selected segmented objects are characterized based upon its computed transformation.

The transformation model may be configured to generate data indicative of a 3D representation of the object in the at least one x-ray image. In this way a 3D x-ray image of the object can be obtained. Advantageously, in a multi-material object, the different materials can be seen separately in the generated 3D x-ray image. It can be determined how the different materials are geometrically distributed in the object. In some cases the objects are symmetrical (e.g. axial symmetrical battery cells, fuel cells, etc.), and in some cases the objects are non-symmetrical (e.g. computing hardware, catalytic converter, fuel cells, etc.). For the non-symmetrical objects, information with respect to some geometrical properties of the objects are determined, measured and/or estimated/predicted. By reconstructing the symmetrical and non-symmetrical objects, it is possible to see where the materials of interest of the object are located, providing an improved characterization.

It will be appreciated that although various examples are provided for axially symmetric objects (e.g. cylindrical battery cells), for example employing an inverse Abel transformation, the invention can also be employed for other shapes, such as box shapes, cubes, rectangular cuboids, etc. Pre-knowledge about its geometry (e.g. symmetry) can be exploited for building a 3D reconstruction. However, this knowledge can also be estimated or predicted by means of a machine learning model. In some examples, non-symmetrical objects are reconstructed in 3D by means of the transformation function/model. The shape of the object may for instance be determined by means of a 3D camera. Additionally or alternatively, a database is used with predefined shapes, and the match is made between the segmented objects in the 2D x-ray image and one of the shapes in the database. Additionally or alternatively, a trained machine learning model is employed for reconstructing a 3D x-ray image of an object based on a 2D x-ray image of the object. It is however also possible that the machine learning model is configured to determine a 3D geometrical shape of the object, and that the x-ray data is subsequently procedurally coupled to the determined geometrical shape of the object.

It will be appreciated that 'the segmented objects associated to symmetric objects' may imply selecting only those segmented objects which are determined/estimated to be symmetric objects. Various methods exist in selecting only the objects having symmetrical properties.

Various neural network models and/or neural network architectures can be used. A neural network has the ability to process, e.g. classify, sensor data and/or pre-processed data, cf. determined features characteristics of the segmented objects. A neural network can be implemented in a computerized system. Neural networks can serve as a framework for various machine learning algorithms for processing complex data inputs. Such neural network systems may "learn" to perform tasks by considering examples, generally without being programmed with any task-specific rules. A neural network can be based on a collection of connected units or nodes called neurons. Each connection, can transmit a signal from one neuron to another neuron in the neural network. A neuron that receives a signal can process it and then signal additional neurons connected to it (cf. activation). The output of each neuron is typically computed by some non-linear function of the sum of its inputs. The connections can have respective weights that adjust as learning proceeds. There may also be other parameters such as biases. Typically, the neurons are aggregated into layers. Different layers may perform different kinds of transformations on their inputs to form a deep neural network.

A deep learning neural network can be seen as a representation-learning method with a plurality of levels of representation, which can be obtained by composing simple but non-linear modules that each transform the representation at one level, starting with the raw input, into a representation at a higher, slightly more abstract level. The neural network may identify patterns which are difficult to see using conventional or classical methods. Hence, instead of writing custom (procedural) code specific to a problem, the network can be trained to be able to handle different and/or changing conditions e.g. using a classification algorithm. Training data may be fed to the neural network such that it can determine a classification logic for providing an accurate output.

It will be further understood that when a particular step of a method is referred to as subsequent to another step, it can directly follow said other step or one or more intermediate steps may be carried out before carrying out the particular step, unless specified otherwise. Likewise it will be understood that when a connection between components such as neurons of the neural network is described, this connection may be established directly or through intermediate components such as other neurons or logical operations, unless specified otherwise or excluded by the context.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

The graphics and/or image/video processing techniques may be implemented in various hardware architectures. Graphics functionality may be integrated within a chipset. Alternatively, a discrete graphics processor may be used. For example, processing of images (still or video) may be performed by a graphics subsystem such as a graphics processing unit (GPU) or a visual processing unit (VPU). As still another embodiment, the graphics or image/video processing functions may be implemented by a general purpose processor, including e.g. a multi-core processor. In a further embodiment, the functions may be implemented in a consumer electronics device. Embodiments, using a combination of different hardware architectures are possible.

In various embodiments, the controller can communicate using wireless systems, wired systems, or a combination of both. When implemented as a wired system, the system may include components and interfaces suitable for communicating or wired communications media, such as input/output (I/O) adapters, physical connectors to connect the I/O adapter with a corresponding wired communications medium. When implemented as a wireless system, the system may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. A wireless communication device may be included in order to transmit and receive signals using various suitable wireless communications techniques. Such techniques may involve communications across one or more wireless networks. Exemplary wireless networks include, but are not limited to, cellular networks, wireless local area networks (WLANs, cfr. WiFi), wireless personal area networks (WPANs), wireless metropolitan area network (WMANs), satellite networks, et cetera. In communicating across such networks, the transmitter may operate in accordance with one or more applicable standards in any version.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method of performing characterization of one or more materials, the method comprising:

scanning the one or more materials by means of a sensory unit including an x-ray sensor for obtaining at least one x-ray image;

performing segmentation of the at least one x-ray image in order to separate one or more distinct objects in the at least one x-ray image;

selecting, in the at least one x-ray image, segmented objects;

computing, for each of the selected segmented objects in the at least one x-ray image, a transformation using a transformation model, wherein each transformation is indicative of a three dimensional reconstruction of the respective selected segmented object in the at least one x-ray image, wherein the transformation model is configured to transform a two dimensional x-ray image of the segmented object into a three dimensional x-ray image of the segmented object; and characterizing the selected segmented objects based upon its computed transformation, wherein the characterization of the selected segmented objects based upon its computed transformation is performed by means of a classification model.

2. The method of claim 1, wherein segmented objects in the at least one x-ray image which are associated to symmetric objects are selected.

3. The method according to claim 1, wherein the segmented objects are associated to axially symmetric objects, and wherein the transformation is an inverse Abel transformation.

4. The method according to claim 1, wherein selection of segmented objects associated to symmetric objects involves estimating whether at least one symmetry line goes through identified segmented objects, wherein the at least one symmetry line is parallel to an imaging plane of the at least one x-ray image, and selecting only the segmented objects with symmetry lines.

5. The method according to claim 1, wherein the classification model is configured to classify between different types of symmetric objects.

6. The method according to claim 1, wherein the classification model is trained to classify axially symmetric batteries, wherein the axially symmetric batteries have a plurality of winded layers made of a different materials.

7. The method according to claim 6, wherein the axially symmetric batteries are at least one of: cylindrical batteries or cell batteries.

8. The method according to claim 6, wherein, for each selected segmented object, x-ray information associated to the plurality of winded layers are disentangled based upon the respective computed transformation, wherein only a portion of the x-ray information is provided as input to the classification mode, wherein the portion of the x-ray information is selected based on one or more predetermined materials of interest.

9. The method according to claim 8, wherein the one or more predetermined materials of interest include cadmium and/or one or more rare earth metals.

10. The method according to claim 1, wherein during scanning the one or more materials are moved on a conveyor, thereby forming a material stream which is scanned by means of the sensory unit, wherein the sensory unit is configured to produce two dimensional x-ray images gathered from one angle above the conveyor belt.

11. The method according to claim 10, wherein the material stream being scanned is a non-homogeneous stream, wherein the material stream includes at least cylindrical batteries.

12. The method according to claim 3, wherein the inverse Abel transformation employs at least one of an onion peeling technique or a basis-set expansion technique.

13. The method according to claim 1, wherein selection of segmented objects are performed utilizing a trained machine learning model.

14. A system for performing characterization of one or more materials, the system comprising:
   a sensory unit configured to scan the one or more materials, the sensory unit including an x-ray sensor for obtaining at least one x-ray image; and
   a controller; and
   wherein the controller is configured to:
   perform segmentation of the at least one x-ray image in order to separate one or more distinct objects in the at least one x-ray image;
   select, in the at least one x-ray image, segmented objects;
   compute, for each of the selected segmented objects in the at least one x-ray image, a transformation using a transformation model, wherein each transformation is indicative of a three dimensional reconstruction of the respective selected segmented object in the at least one x-ray image; and
   characterize the selected segmented objects based upon its computed transformation.

15. A recycling device configured to sort a waste stream, wherein the recycling device includes the system according to claim 14 for distinguishing different materials in the waste stream.

16. The method according to claim 11, wherein the cylindrical batteries are multiple types of cylindrical batteries.

17. The method according to claim 2, wherein the segmented objects are associated to axially symmetric objects, and wherein the transformation is an inverse Abel transformation.

18. The method according to claim 2, wherein selection of segmented objects associated to symmetric objects involves estimating whether at least one symmetry line goes through identified segmented objects, wherein the at least one symmetry line is parallel to an imaging plane of the at least one x-ray image, and selecting only the segmented objects with symmetry lines.

19. The method according to claim 3, wherein selection of segmented objects associated to symmetric objects involves estimating whether at least one symmetry line goes through identified segmented objects, wherein the at least one symmetry line is parallel to an imaging plane of the at least one x-ray image, and selecting only the segmented objects with symmetry lines.

20. The method according to claim 7, wherein, for each selected segmented object, x-ray information associated to the plurality of winded layers are disentangled based upon the respective computed transformation, wherein only a portion of the x-ray information is provided as input to the classification mode, wherein the portion of the x-ray information is selected based on one or more predetermined materials of interest.

* * * * *